(12) United States Patent
Ali-Tolppa et al.

(10) Patent No.: US 12,120,009 B2
(45) Date of Patent: Oct. 15, 2024

(54) APPARATUS, METHOD, AND COMPUTER PROGRAM

(71) Applicant: NOKIA SOLUTIONS AND NETWORKS OY, Espoo (FI)

(72) Inventors: Janne Tapio Ali-Tolppa, Taufkirchen (DE); Jürgen Goerge, Neuried (DE); Anatoly Andrianov, Schaumburg, IL (US); Jing Ping, Chengdu (CN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 178 days.

(21) Appl. No.: 17/431,403

(22) PCT Filed: Feb. 18, 2019

(86) PCT No.: PCT/CN2019/075401
§ 371 (c)(1),
(2) Date: Aug. 16, 2021

(87) PCT Pub. No.: WO2020/168457
PCT Pub. Date: Aug. 27, 2020

(65) Prior Publication Data
US 2022/0141105 A1    May 5, 2022

(51) Int. Cl.
*H04L 43/0805* (2022.01)
*H04W 24/02* (2009.01)

(52) U.S. Cl.
CPC ......... *H04L 43/0805* (2013.01); *H04W 24/02* (2013.01)

(58) Field of Classification Search
CPC .... H04L 43/0805; H04W 24/02; H04W 48/12
See application file for complete search history.

(56) References Cited

U.S. PATENT DOCUMENTS

| | | | |
|---|---|---|---|
| 10,536,946 B2* | 1/2020 | Zhu | H04W 28/0247 |
| 10,638,367 B2* | 4/2020 | Faccin | H04W 72/56 |
| 10,736,028 B2* | 8/2020 | Griot | H04W 88/18 |
| 11,051,210 B2* | 6/2021 | Sciancalepore | H04W 24/02 |

(Continued)

FOREIGN PATENT DOCUMENTS

| | | |
|---|---|---|
| CN | 107835104 A | 3/2018 |
| CN | 110140386 A | 8/2019 |

(Continued)

OTHER PUBLICATIONS

Extended European Search Report for European Application No. 19916295.9 dated Oct. 6, 2022, 7 pages.

(Continued)

*Primary Examiner* — Abdullahi E Salad
(74) *Attorney, Agent, or Firm* — Lippes Mathias LLP

(57) ABSTRACT

An apparatus comprising: at least one processor; and at least one memory including computer program code; the at least one memory and the computer program code configured to, with the at least one processor, cause the apparatus at least to: determine (902) that at least one state of a network slice is to be adjusted in a limited geographical area of at least one network resource; and adjust (904, 906, 908) the at least one state of the network slice in the limited geographical area of the at least one network resource.

12 Claims, 11 Drawing Sheets

---

902 Determining that an administrative state of a network slice in a limited geographic area of at least one resource ↓ unlocked     ↓ shutting down     ↓ locked

904 Setting an administrative state attribute of a slice specific vector to an unlocked value

906 Setting an administrative state attribute of a slice specific vector to a shutting down value

908 Setting an administrative state attribute of a slice specific vector to a locked value

(56) References Cited

U.S. PATENT DOCUMENTS

| | | | |
|---|---|---|---|
| 11,122,439 B2* | 9/2021 | Wang | H04W 88/14 |
| 11,750,447 B2* | 9/2023 | Maguire | H04L 41/5041 |
| | | | 709/223 |
| 2018/0317163 A1* | 11/2018 | Lee | H04W 48/18 |
| 2019/0021038 A1 | 1/2019 | Shaw et al. | |
| 2019/0132728 A1 | 5/2019 | Shekhar et al. | |
| 2019/0349838 A1 | 11/2019 | Futaki et al. | |
| 2021/0282082 A1 | 9/2021 | Mildh et al. | |

FOREIGN PATENT DOCUMENTS

| | | |
|---|---|---|
| CN | 110402600 A | 11/2019 |
| WO | WO 2018/199672 A1 | 11/2018 |
| WO | WO 2020/200419 | 10/2020 |

OTHER PUBLICATIONS

Office Action for Chinese Application No. 201980092329.6 dated Aug. 29, 2022, 13 pages.

"3rd Generation Partnership Project; Technical Specification Group Core Network and Terminals; Numbering, addressing and identification (Release 15)", 3GPP TS 23.003 v15.6.0, (Dec. 22, 2018), 130 pages.

"3rd Generation Partnership Project; Technical Specification Group Services and System Aspects; Management and orchestration; 5G Network Resource Model (NRM); Stage 2 and stage 3 (Release 15)", 3GPP TS 28.541 v15.0.1 (Sep. 21, 2018), 225 pages.

"3rd Generation Partnership Project; Technical Specification Group Services and System Aspects; System Architecture for the 5G System; Stage 2 (Release 15)", 3GPP TS 23.501 v15.4.0, (Dec. 18, 2018), 236 pages.

"3rd Generation Partnership Project; Technical Specification Group Services and System Aspects; Telecommunication management; Configuration Management (CM); Basic CM Integration Reference Point (IRP); Information Service (IS) (Release 15)", 3GPP TS 32.602 v15.0.0, (Jun. 27, 2018), 27 pages.

"3rd Generation Partnership Project; Technical Specification Group Services and System Aspects; Telecommunication management; Configuration Management (CM); Kernel CM Information Service (IS) (Release 15)", 3GPP TS 32.662 v15.0.0, (Jun. 27, 2018), 21 pages.

"3rd Generation Partnership Project; Technical Specification Group Services and System Aspects; Telecommunication management; Evolved Universal Terrestrial Radio Access Network (E-UTRAN) Network Resource Model (NRM) Integration Reference Point (IRP); Information Service (IS) (Release 11)", 3GPP TS 32.762 v11.7.0 (Mar. 17, 2014), 59 pages.

"3rd Generation Partnership Project; Technical Specification Group Services and System Aspects; Telecommunication management; State Management Data Definition Integration Reference Point (IRP); Information Service (IS) (Release 15)", 3GPP TS 28.625 v15.0.0, (Jun. 22, 2018), 10 pages.

"Information Technology—Open Systems Interconnection—Systems Management: State Management Function", The International Telegraph and Telephone Consultative Committee, ITU-T X.731 (Jan. 92), (Jan. 1992), 29 pages.

International Search Report and Written Opinion for Patent Cooperation Treaty Application No. PCT/CN2019/075401 dated Nov. 19, 2019, 9 pages.

Office Action for Chinese Application No. 201980092329.6 dated Mar. 24, 2023, 12 pages.

* cited by examiner

ME=1,GNBDUFunction=1,NRCellDU=1

| S-NSSAI (SST-SD) | Administrative State | Operational State | Availability Status |
|---|---|---|---|
| 1ffffff | Locked | Enabled | |
| 4:c | Unlocked | Disabled | Dependency |
| 2ffffff | Unlocked | Enabled | |

| IOCState | Administrative State | Operational State | Availability Status |
|---|---|---|---|
| | Unlocked | Enabled | Degraded |

ME=1,GNBDUFunction=1,NRCellDU=2

| S-NSSAI (SST-SD) | Administrative State | Operational State | Availability Status |
|---|---|---|---|
| 1ffffff | Unlocked | Enabled | |
| 4:c | Unlocked | Enabled | |
| 2ffffff | Unlocked | Enabled | |

| IOCState | Administrative State | Operational State | Availability Status |
|---|---|---|---|
| | Unlocked | Enabled | |

Fig. 6

APPARATUS, METHOD, AND COMPUTER PROGRAM

CROSS-REFERENCE TO RELATED APPLICATIONS

This application is a national phase entry of International Application No. PCT/CN2019/075401, filed Feb. 18, 2019, the entire contents of which are incorporated herein by reference.

FIELD OF THE DISCLOSURE

The present disclosure relates to an apparatus, a method, and a computer program for managing the states (e.g. administrative state, operational state or availability status) of a network slice in a limited geographical area of at least one resource supporting the network slice.

BACKGROUND

A communication system can be seen as a facility that enables communication sessions between two or more entities such as user terminals, base stations/access points and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet. In a wireless communication system at least a part of a communication session between at least two stations occurs over a wireless link.

A user can access the communication system by means of an appropriate communication device or terminal. A communication device of a user is often referred to as user equipment (UE) or user device. A communication device is provided with an appropriate signal receiving and transmitting apparatus for enabling communications, for example enabling access to a communication network or communications directly with other users. The communication device may access a carrier provided by a station or access point, and transmit and/or receive communications on the carrier.

The communication system and associated devices typically operate in accordance with a required standard or specification which sets out what the various entities associated with the system are permitted to do and how that should be achieved. Communication protocols and/or parameters which shall be used for the connection are also typically defined. One example of a communications system is UTRAN (3G radio). Another example of an architecture that is known as the long-term evolution (LTE) or the Universal Mobile Telecommunications System (UMTS) radio-access technology. Another example communication system is so called 5G radio or new radio (NR) access technology.

SUMMARY

According to an aspect there is provided an apparatus comprising at least one processor and at least one memory including computer code for one or more programs, the at least one memory and the computer code configured, with the at least one processor, to cause the apparatus at least to: determine that at least one state of a network slice is to be adjusted in a limited geographical area of at least one network resource; and adjust the at least one state of the network slice in the limited geographical area of the at least one network resource.

The at least one network resource may comprise a core network resource.

The at least one network resource may comprise a radio access network resource.

The at least one network resource may comprise a tracking area.

The at least one network resource may comprise a cell.

The at least one state of the networks slice may comprise an operational state.

The operational state may take at least one of an enabled value and a disable value.

The at least one state of the networks slice may comprise an availability status.

The availability status may take at least one of an in test value, degraded value, a dependency value, a failed value, a power off value, an off line value, an off duty value, a not installed value and a log full value.

The at least one state of the networks slice may comprise an administrative state.

The administrative state may take at least one of a locked value, unlocked value and a shutting down value.

The at least one network resource may be associated with a list network slices supported by the network resource.

Each network slice in the list of network slices may be supported by the at least one network resource is associated with a slice specific state vector of at least one state attribute.

Adjusting the at least one state of the network slice may comprise adjusting the at least one state attribute of the slice specific vector.

The limited geographic area may be smaller than a geographic coverage of the network slice.

The at least one memory and the computer program code adjusted to, with the at least one processor, may cause the apparatus at least to: send a notification that the at least one state of the network slice has been adjusted in the limited geographical area of the at least one network resource to a management service provider.

The at least one memory and the computer program code adjusted to, with the at least one processor, may cause the apparatus at least to: send a notification that the at least one state of the network slice has been adjusted in the limited geographical area of the at least one network resource to a management service provider if the management service provider has subscribed to notifications.

The at least one memory and the computer program code adjusted to, with the at least one processor, may cause the apparatus at least to: determine that at least one state of the network slice is not to be adjusted outside the limited geographic area of at least one other network resource; and abstain from adjusting the at least one state of the network slice outside the limited geographic area of the at least one other network resource.

According to an aspect there is provided an apparatus comprising circuitry configured to: determine that at least one state of a network slice is to be adjusted in a limited geographical area of at least one network resource; and adjust the at least one state of the network slice in the limited geographical area of the at least one network resource.

The at least one network resource may comprise a core network resource.

The at least one network resource may comprise a radio access network resource.

The at least one network resource may comprise a tracking area.

The at least one network resource may comprise a cell.

The at least one state of the networks slice may comprise an operational state.

The operational state may take at least one of an enabled value and a disable value.

The at least one state of the networks slice may comprise an availability status.

The availability status may take at least one of an in test value, degraded value, a dependency value, a failed value, a power off value, an off line value, an off duty value, a not installed value and a log full value.

The at least one state of the networks slice may comprise an administrative state.

The administrative state may take at least one of a locked value, unlocked value and a shutting down value.

The at least one network resource may be associated with a list network slices supported by the network resource.

Each network slice in the list of network slices may be supported by the at least one network resource is associated with a slice specific state vector of at least one state attribute.

Adjusting the at least one state of the network slice may comprise adjusting the at least one state attribute of the slice specific vector.

The limited geographic area may be smaller than a geographic coverage of the network slice.

The circuitry may be configured to: send a notification that the at least one state of the network slice has been adjusted in the limited geographical area of the at least one network resource to a management service provider.

The circuitry may be configured to: send a notification that the at least one state of the network slice has been adjusted in the limited geographical area of the at least one network resource to a management service provider if the management service provider has subscribed to notifications.

The circuitry may be configured to: determine that at least one state of the network slice is not to be adjusted outside the limited geographic area of at least one other network resource; and abstain from adjusting the at least one state of the network slice outside the limited geographic area of the at least one other network resource.

According to an aspect there is provided an apparatus comprising means for: determining that at least one state of a network slice is to be adjusted in a limited geographical area of at least one network resource; and adjusting the at least one state of the network slice in the limited geographical area of the at least one network resource.

The at least one network resource may comprise a core network resource.

The at least one network resource may comprise a radio access network resource.

The at least one network resource may comprise a tracking area.

The at least one network resource may comprise a cell.

The at least one state of the networks slice may comprise an operational state.

The operational state may take at least one of an enabled value and a disable value.

The at least one state of the networks slice may comprise an availability status.

The availability status may take at least one of an in test value, degraded value, a dependency value, a failed value, a power off value, an off line value, an off duty value, a not installed value and a log full value.

The at least one state of the networks slice may comprise an administrative state.

The administrative state may take at least one of a locked value, unlocked value and a shutting down value.

The at least one network resource may be associated with a list network slices supported by the network resource.

Each network slice in the list of network slices may be supported by the at least one network resource is associated with a slice specific state vector of at least one state attribute.

Adjusting the at least one state of the network slice may comprise adjusting the at least one state attribute of the slice specific vector.

The limited geographic area may be smaller than a geographic coverage of the network slice.

The apparatus may comprise means for: sending a notification that the at least one state of the network slice has been adjusted in the limited geographical area of the at least one network resource to a management service provider.

The apparatus may comprise means for: sending a notification that the at least one state of the network slice has been adjusted in the limited geographical area of the at least one network resource to a management service provider if the management service provider has subscribed to notifications.

The apparatus may comprise means for: determining that at least one state of the network slice is not to be adjusted outside the limited geographic area of at least one other network resource; and abstaining from adjusting the at least one state of the network slice outside the limited geographic area of the at least one other network resource.

According to an aspect there is provided a method comprising: determining that at least one state of a network slice is to be adjusted in a limited geographical area of at least one network resource; and adjusting the at least one state of the network slice in the limited geographical area of the at least one network resource.

The at least one network resource may comprise a core network resource.

The at least one network resource may comprise a radio access network resource.

The at least one network resource may comprise a tracking area.

The at least one network resource may comprise a cell.

The at least one state of the networks slice may comprise an operational state.

The operational state may take at least one of an enabled value and a disable value.

The at least one state of the networks slice may comprise an availability status.

The availability status may take at least one of an in test value, degraded value, a dependency value, a failed value, a power off value, an off line value, an off duty value, a not installed value and a log full value.

The at least one state of the networks slice may comprise an administrative state.

The administrative state may take at least one of a locked value, unlocked value and a shutting down value.

The at least one network resource may be associated with a list network slices supported by the network resource.

Each network slice in the list of network slices may be supported by the at least one network resource is associated with a slice specific state vector of at least one state attribute.

Adjusting the at least one state of the network slice may comprise adjusting the at least one state attribute of the slice specific vector.

The limited geographic area may be smaller than a geographic coverage of the network slice.

The method may comprise: sending a notification that the at least one state of the network slice has been adjusted in the limited geographical area of the at least one network resource to a management service provider.

The method may comprise: sending a notification that the at least one state of the network slice has been adjusted in the limited geographical area of the at least one network resource to a management service provider if the management service provider has subscribed to notifications.

The method may comprise: determining that at least one state of the network slice is not to be adjusted outside the limited geographic area of at least one other network resource; and abstaining from adjusting the at least one state of the network slice outside the limited geographic area of the at least one other network resource.

According to an aspect there is provided a computer program comprising computer executable code which when run on at least one processor is configured to: determine that at least one state of a network slice is to be adjusted in a limited geographical area of at least one network resource; and adjust the at least one state of the network slice in the limited geographical area of the at least one network resource.

The at least one network resource may comprise a core network resource.

The at least one network resource may comprise a radio access network resource.

The at least one network resource may comprise a tracking area.

The at least one network resource may comprise a cell.

The at least one state of the networks slice may comprise an operational state.

The operational state may take at least one of an enabled value and a disable value.

The at least one state of the networks slice may comprise an availability status.

The availability status may take at least one of an in test value, degraded value, a dependency value, a failed value, a power off value, an off line value, an off duty value, a not installed value and a log full value.

The at least one state of the networks slice may comprise an administrative state.

The administrative state may take at least one of a locked value, unlocked value and a shutting down value.

The at least one network resource may be associated with a list network slices supported by the network resource.

Each network slice in the list of network slices may be supported by the at least one network resource is associated with a slice specific state vector of at least one state attribute.

Adjusting the at least one state of the network slice may comprise adjusting the at least one state attribute of the slice specific vector.

The limited geographic area may be smaller than a geographic coverage of the network slice.

The computer program comprising computer executable code which when run on at least one processor may be configured to: send a notification that the at least one state of the network slice has been adjusted in the limited geographical area of the at least one network resource to a management service provider.

The computer program comprising computer executable code which when run on at least one processor may be configured to: send a notification that the at least one state of the network slice has been adjusted in the limited geographical area of the at least one network resource to a management service provider if the management service provider has subscribed to notifications.

The computer program comprising computer executable code which when run on at least one processor may be configured to: determine that at least one state of the network slice is not to be adjusted outside the limited geographic area of at least one other network resource; and abstaining from adjusting the at least one state of the network slice outside the limited geographic area of the at least one other network resource.

According to an aspect, there is provided a computer readable medium comprising program instructions stored thereon for performing at least one of the above methods.

According to an aspect, there is provided a non-transitory computer readable medium comprising program instructions stored thereon for performing at least one of the above methods.

According to an aspect, there is provided a non-volatile tangible memory medium comprising program instructions stored thereon for performing at least one of the above methods.

In the above, many different aspects have been described. It should be appreciated that further aspects may be provided by the combination of any two or more of the aspects described above.

Various other aspects are also described in the following detailed description and in the attached claims.

LIST OF ABBREVIATIONS

AF: Application Function
AUSF: Authentication Server Function
AMF: Access Management Function
BTS: Base Transceiver Station
CU: Centralized Unit
DN: Distinguished name
DU: Distributed Unit
GNB: gNodeB
GSM: Global System for Mobile communication
IOC: Information Object Class
IRP: Integration Reference Point
Itfn: Interface N
ITU: International Telecommunication Union
LTE: Long Term Evolution
NEF: Network Exposure Function
NR: New Radio
ME: Management Entity
MS: Mobile Station
MTC: Machine Type Communication
MO: Managed Object
NRM: Network Resource Model
NSI: Network Slice Instance
NSSI: Network Slice Subnet Instance
OAM: Operation and Management
RAM: Random Access Memory
RAN: Radio Access Network
ROM: Read Only Memory
SD: Slice Differentiator
SMF: Session Management Function
S-NSSAI: Single Network Slice Selection Assistance Information
SST: Slice Service Type
TS: Technical Specification
UDM: User Data Management
UE: User Equipment
UMTS: Universal Mobile Telecommunication System
UP: User Plane UPF: User Plane Function
USB: Universal Serial Bus
3GPP: 3$^{rd}$ Generation Partnership Project
5G: 5$^{th}$ Generation
5GC: 5G Core network
5GS: 5G System

TECHNICAL SPECIFICATIONS

One or more of the following aspects relate to the following technical specifications.
3GPP TS 23.501 (v15.4.0)
3GPP TS 28.541 (v15.0.1)
3GPP TS 28.625 (v15.0.0)
3GPP TS 32.602 (v15.0.0)
3GPP TS 32.762 (v11.7.0)
ITU-T X.731

BRIEF DESCRIPTION OF THE FIGURES

Embodiments will now be described, by way of example only, with reference to the accompanying Figures in which:

FIG. 4a shows a schematic representation of network slices of a network;

FIG. 4b shows a schematic representation of one of the network slices of FIG. 4a;

FIG. 6 shows the states of two cells served by a same gNodeB distributed unit function and supporting the same slices according to one or more aspects;

DETAILED DESCRIPTION OF THE FIGURES

In the following certain embodiments are explained with reference to mobile communication devices capable of communication via a wireless cellular system and mobile communication systems serving such mobile communication devices. Before explaining in detail the exemplifying embodiments, certain general principles of a wireless communication system, access systems thereof, and mobile communication devices are briefly explained with reference to FIGS. 1 to 3 to assist in understanding the technology underlying the described examples.

Figure 1:
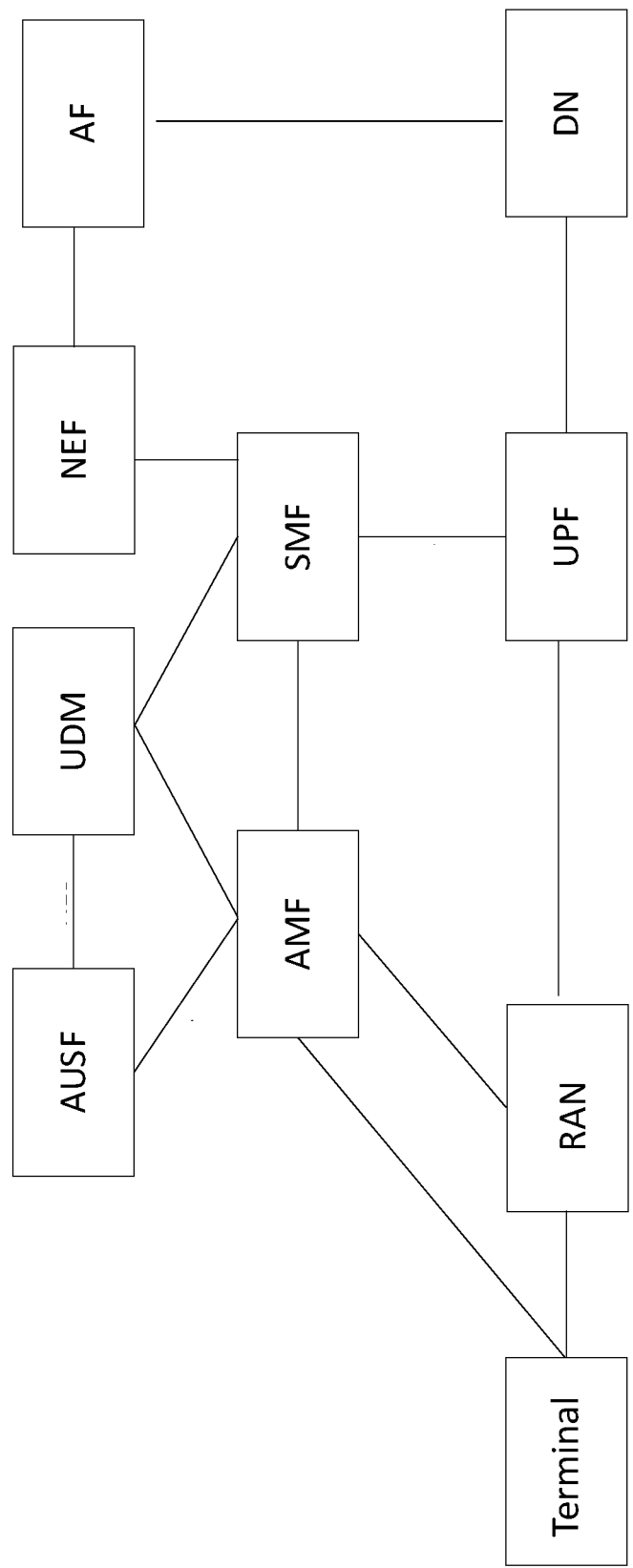
FIG. 1 shows a schematic representation of a 5G system.

FIG. 1 shows a schematic representation of a 5G system (5GS). The 5GS may comprises a terminal, a 5G radio access network (5G RAN), a 5G core network (5GC), one or more application function (AF) and one or more data networks (DN).

The 5G RAN may comprise one or more gNodeB (GNB) distributed unit functions (GNBDUFunctions) connected to one or more gNodeB (GNB) centralized unit functions (GNBCUFunctions).

The 5GC may comprise an access management function (AMF), a session management function (SMF), an authentication server function (AUSF), a user data management (UDM), a user plane function (UPF) and/or a network exposure function (NEF).

Figure 2:
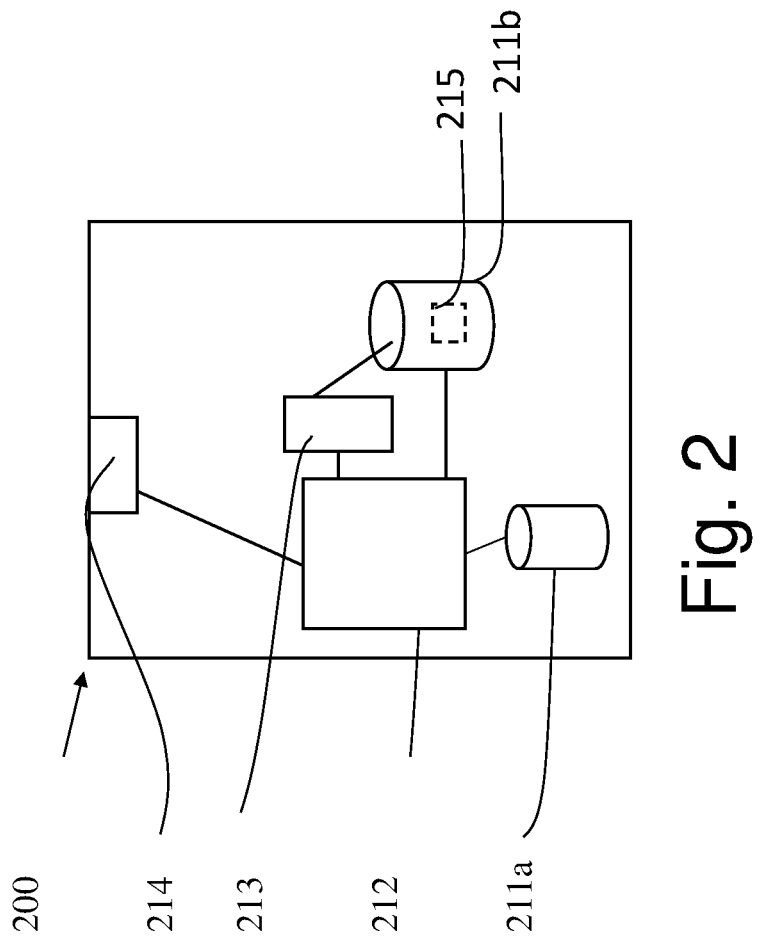
FIG. 2 shows a schematic representation of a control apparatus.

FIG. 2 illustrates an example of a control apparatus 200 for controlling a function, such as a function of the 5G RAN or the 5GC as illustrated on FIG. 1. The control apparatus may comprise at least one random access memory (RAM) 211a, at least on read only memory (ROM) 211b, at least one processor 212, 213 and an input/output interface 214. The at least one processor 212, 213 may be coupled to the RAM 211a and the ROM 211b. Via the input/output interface 214 may be coupled to other components of the function of the 5G RAN or the 5GC. The at least one processor 212, 213 may be configured to execute an appropriate software code 215. The software code 215 may for example allow to perform one or more steps to perform one or more of the following aspects. The software code 215 may be stored in the ROM 211b. The control apparatus 200 may be interconnected with another control apparatus 200 controlling another function of the 5G RAN or of the 5GC. In some embodiments, each function of the 5G RAN or the 5GC comprises a control apparatus 200. In alternative embodiments, two or more function of the 5G RAN or the 5GC may share a control apparatus.

Figure 3:
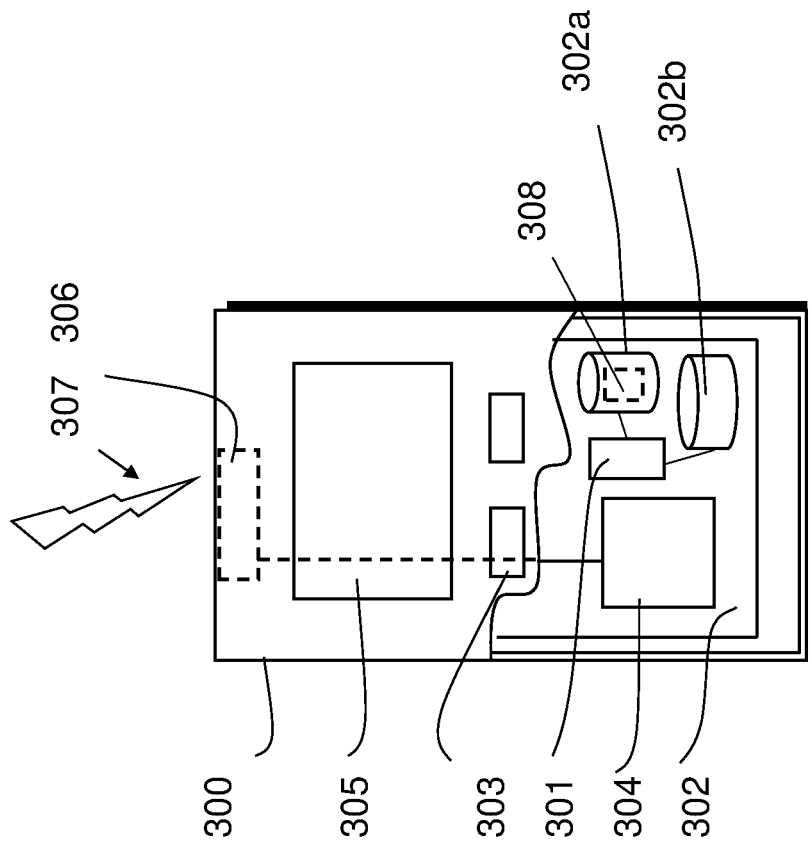
FIG. 3 shows a schematic representation of a terminal.

FIG. 3 illustrates an example of a terminal 300, such as the terminal illustrated on FIG. 1. The terminal 300 may be provided by any device capable of sending and receiving radio signals. Non-limiting examples comprise a user equipment, a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, an Internet of things (IoT) type communication device or any combinations of these or the like. The terminal 300 may provide, for example, communication of data for carrying communications. The communications may be one or more of voice, electronic mail (email), text message, multimedia, data, machine data and so on.

The terminal 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the mobile device.

The terminal 300 may be provided with at least one processor 301, at least one memory ROM 302a, at least one RAM 302b and other possible components 303 for use in software and hardware aided execution of tasks it is designed to perform, including control of access to and communications with access systems and other communication devices. The at least one processor 301 is coupled to the RAM 211a and the ROM 211b. The at least one processor 301 may be configured to execute an appropriate software code 308. The software code 308 may for example allow to perform one or more of the following aspects. The software code 308 may be stored in the ROM 211b.

The processor, storage and other relevant control apparatus can be provided on an appropriate circuit board and/or in chipsets. This feature is denoted by reference 304. The device may optionally have a user interface such as key pad 305, touch sensitive screen or pad, combinations thereof or the like. Optionally one or more of a display, a speaker and a microphone may be provided depending on the type of the device.

Although one or more of the preceding aspects relate to 5G systems, it will be understood that similar aspects may relate to other mobile systems, in particular, LTE systems.

Mobile systems, like LTE systems or 5G systems, comprise physical resources. These physical resources may be shared to offer multiple virtual networks to users. These virtual networks, called "slices", may be designed to offer specific properties like high bandwidth, low latency, or to support a huge number of IoT devices. These slices may serve different users with different service level agreements. The slices may be isolated/independent from each other. To be able to offer slices on demand, various mechanisms have been proposed to create, activate, de-activate and delete slices quickly.

Figures 4A, 4B:
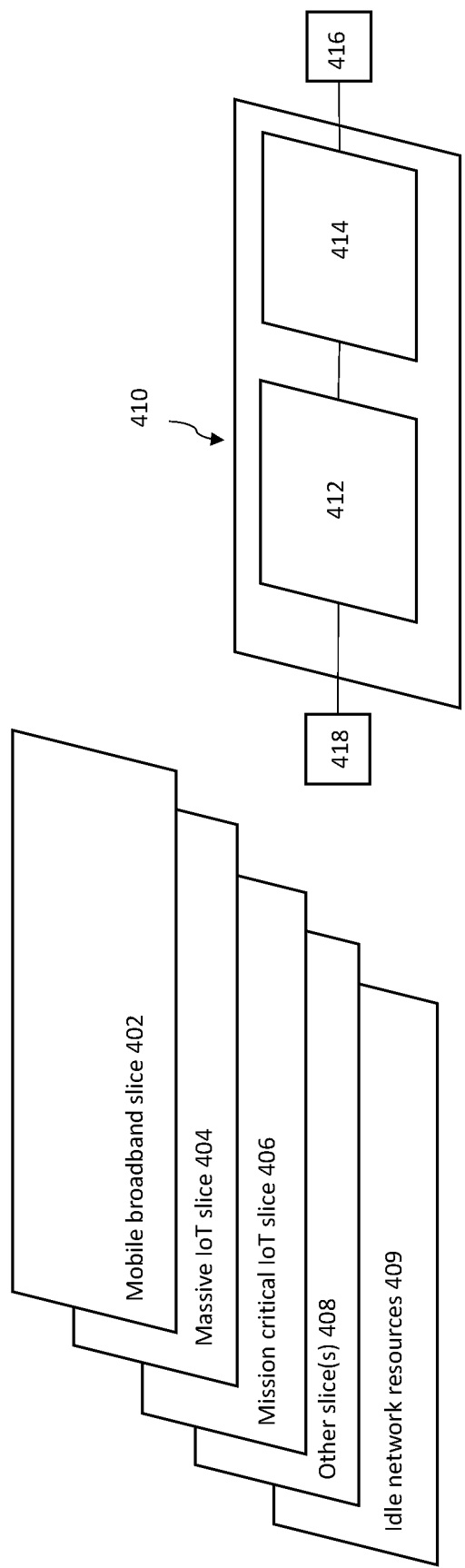

FIG. 4a shows a schematic representation of a physical network sliced into multiple virtual networks (i.e. network slices). The network slices may comprise a mobile broadband slice 402, a massive Internet of Things (IoT) slice 404, a mission critical IoT slice 406 and/or one or more other slices 408. The physical network may comprise idle network resources 409 (i.e. resources that are not allocated to any network slice).

The mobile broadband slice 402 may be associated with communication services, entertainment services and/or Internet services. The massive IoT slice 404 may be associated with retail services, shipping services, logistics services, agriculture services, climate services and/or manufacturing services. The mission critical IoT slice 406 may be associated with automotive services, medical services and/or infrastructure services. The one or more other slices 408 may be associated with one or more other services.

FIG. 4b shows a schematic representation a network slice 410. The network slice 410 comprises one or more subnetworks 412 and 414. The subnetwork 412 may be a radio access subnetwork. The subnetwork 414 may be a core subnetwork. The subnetwork 412 may be connected to one or more terminals 418. The subnetwork 416 may be connected to one or more radio access functions or data networks 420.

To manage mobile systems that are offering slices, 3GPP has defined a network resource model (3GPP TS 28.541). In this model each managed object may be modelled with an instance of a managed object class. A managed object class may for example include a "NetworkSlice", "NetworkSliceSubnet" or other.

An instance of a managed object class may be characterized by one or more attributes. These attributes may include "Administrative State", "Operational State", "Availability Status" or other.

The attribute "Administrative State" may take one or more values including "Locked", "Unlocked", "Shuttingdown" or other as defined in 3GPP TS 28.625 and ITU-T X.731. These values may indicate a permission to use a managed object or prohibition from using a managed object.

The permission to use a managed object or prohibition from using a managed object may be imposed through operation and management (OAM) services.

When the attribute "Administrative State" is set to "Locked", the managed object may not available for service with an immediate effect. When the attribute "Administrative State" is set to "Shuttingdown", a more graceful shut down may be provided. The managed object may be allowed to serve current users, but may not accept new users. The attribute "Administrative State" may be set to "Locked" as soon as the last current user has been served and quits the managed object.

Figure 5:
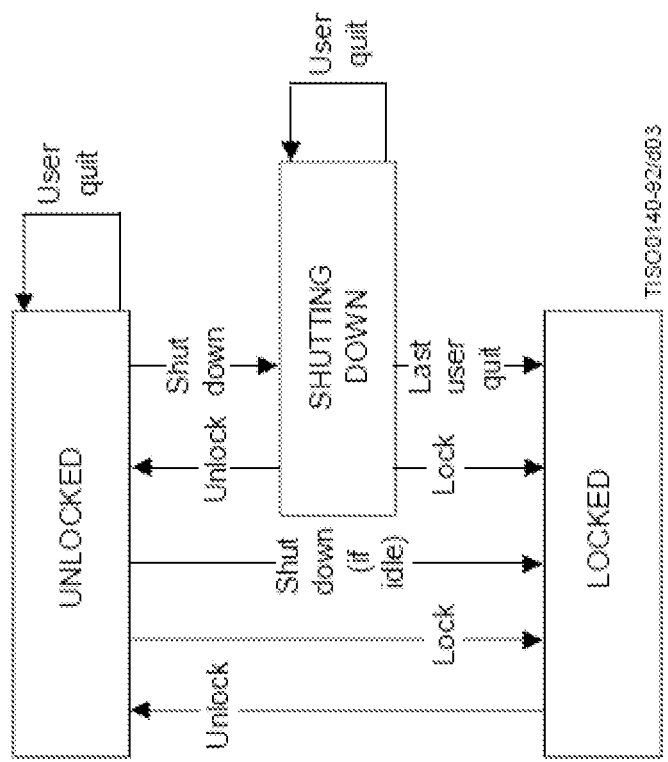
FIG. 5 shows a schematic representation of a state transition process according to ITU-T X.731 "State management Function"

FIG. 5 shows a schematic representation of a state transition process according to ITU-T X.731 "State management Function".

Setting the attribute "Administrative State" of an instance of "NetworkSlice" to "Lock" or "Unlock" may be used in one or more of the following situations.

A slice may require resources to be configured prior to be formed. An operator may needs to prepare and configure, or reconfigure, all resources before the slice is released for use by the users. During configuration the operator may lock the slice to block traffic from the slice. After configuration, the operator may unlock the slice to allow traffic to the slice. Alternatively or additionally, the operator may want to lock or unlock the slice temporarily, without the need to decommission and/or deconfigure the slice.

The attribute "Operational State" may characterize an instance of "NetworkSlice" (3GPP TS 28.541, 3GPP TS 28.625 and ITU-T X.731). The attribute "Operational State" may indicate if the resources required by a network slice are installed and working. The attribute "Operational State" may take one or more values including "Enabled" or "Disabled".

The attribute "Availability Status" may give more information as to the reasons behind the "Administrative State" and "Operational State" of an instance of a managed object class. The state "Availability Status" may take one or more values including "in test", "degraded", "dependency", "failed", "power off", "off line", "off duty", "degraded", "not installed" or "log full". The state "Availability Status" may be defined for a number of information object class (IOC) in the 3GPP TS 28.541, including NRCellDU IOCs for cells, but not for network slices.

Both the attributes "Operational State" and the "Availability Status" may be read-only. In other words, the management system may not change the values taken by the attributes "Operational State" and the "Availability Status" of an instance of a managed object class.

It may be the case that the operator does not want to change the "Administrative State" of an instance of "Network Slice" in a whole geographical area of a slice, but only in a limited geographical area smaller than the whole geographical area of the slice.

A slice reconfiguration requiring locking may only be required in a subset of radio access network functions (e.g. a subset of cells) and/or a subset of core network functions serving a limited geographical area. The locking may not be required in the whole set of network slice subnets that form a slice serving the whole coverage area of the slice.

The operator may want to lock and/or unlock the slice temporarily, without the need to decommission and/or deconfigure the slice, but only in a subset of radio access network functions (e.g. a subset of cells) and/or a subset of core network functions serving a limited geographical area.

The geographical coverage of a slice may need to be reduced and the operator may want to utilize the shuttingdown state to achieve a graceful shutdown of the slice in a subset of radio access network functions (e.g. a subset of cells) and/or a subset of core network functions serving a limited decommissioned geographical area.

Setting the administrative state may need to work in situations where the different constituents of the slice are provided by different vendors. A concrete example may be, when an operator wants to lock a slice at an airport, including all different radio access layers implemented by different vendors, but only at the airport and not in a wider geographical scope (e.g. not nationwide).

Similarly, the operational state of a network slice instance (NSI) or network slice subnet instance (NSSI) may need to be able to reflect (e.g. a situation), where only a limited geographical scope is affected by a failure. It may be important to be able to indicate the operational state of a given slice in different geographical scopes in a multi-vendor environment (e.g. to be quickly able to get a better overview of the extent of a problem).

Existing techniques for handling the network slice administrative and operational state may only allow configuring or indicating them for a complete NSI or NSSI, but not for a subset of radio access network functions (e.g. a subset of cells) and/or a subset of core network functions serving a limited decommissioned geographical area limited geographical scope.

Moreover, changing the administrative or indicating the operational state of a cell (NRCellDU IOC) may not be utilized in case where the same cell is serving more than the one slice and not all slices should be affected by a given state. For example changing the administrative state of a cell may lock the cell for all access, affecting all slices that it serves.

The state management function for mobile systems management is defined in ITU-T recommendation X.731 (2/92).

The state management (administrative and operational states) for network slicing is described in 3GPP TS 28.541 (section 6.3 and Appendix B). However, it allows this only on NSI or NSSI level. The availability status is not yet defined for NSI or NSSI.

TS 28.541 defines also the administrative and operational states and availability status for the NRCellDU IOC (section 4.3.5). Similarly, 3GPP TS 32.762 defines the states for LTE EUtranGenericCell IOC. However, neither NRM allows defining the states per slice, in case several slices are using the same cell.

One or more of the following aspects provide a mechanism for slice state management in specified geographical areas, and in particular in a subset of radio access network functions (e.g. a subset of cells) and/or a subset of core network functions serving these specified geographical areas.

One or more of the following aspects provide a mechanism to configure or indicate the slice administrative or operational states, or the availability status, in a specified geographical scope that is more fine-granular than the whole NSI or NSSI. The slice state may be configured or indicated for each NSI per tracking area, per subset of cells, per cell or potentially even a smaller geo-granularity than a cell.

A solution may be to include the network slice state management, including especially the slice administrative state, operational state and the availability status, in the Network Resource Model (NRM) (3GPP TS 28.541) in a way that supports slice-aware scoping. This may be either by modifying an existing IOC or attribute or by introducing a new data structure.

For example, a new attribute or the extended sNSSAIList attribute of the NRCellDU IOC may consist of a list of S-NSSAIs supported by the NRCellDU and their state vectors (slice specific), including the administrative and the operational states as well as the availability status. In an alternative example, the NRCellDU may contain a new IOC with an instance in a list for each slice it is supporting, and those IOCs may have states specified. This way the existing 3GPP Interface-N (Itf-N) BasicCMIRP and NotificationIRP interfaces may be used out of the box.

Note that some of the states, such as the operational state and the availability status, may be read-only, so they are used only to indicate the state, but cannot be set by the management system. By contrast, the administrative state may be writable and may be used to control the locking, unlocking and shutting down of the slice in a limited geographical area. Another example implementation may be to extend the NetworkSliceSubnet IOC attribute mFId.

An example of an extended list is given in FIG. 6. A Network Slice Selection Assistant Information (S-NSSAI) identifies a slice and consists of the Slice/Service Type (SST) identifier and the Slice Differentiator (SD), see 3GPP TS 23.501 for further details.

A NRCellDU=1 may have a problem with slice S-NSSAI 4:1. The operational state associated with NRCellDU=1 and with slice S-NSSAI 4:1 may be set to "Disabled". The availability status associated with NRCellDU=1 and with slice S-NSSAI 4:1 may be set to "Dependency" to indicate that the problem may be because of a dependent resource that the reporting NRCellDU=1 does not control.

The NRCellDU=1 may not have a problem with slice S-NSSAI 1:FFFFFF (the hexadecimal value FFFFFF may be set to indicate that no slice differentiator is given). The administrative state associated with NRCellDU=1 and with slice 1:FFFFFF may be set to "Locked" to ensure the availability of the critical slice 2:FFFFFF. The operational state associated with NRCellDU=1 and with slice S-NSSAI 1:FFFFFF may be set to "Enabled".

The NRCellDU=1 may not have a problem with slice S-NSSAI 2:FFFFFF. The administrative state associated with NRCellDU=1 and with slice 2:FFFFFF may be set to "Unlocked". The operational state associated with NRCellDU=1 and with slice S-NSSAI 2:FFFFFF may be set to "Enabled".

The NRCellDU=2 may not have a problem with slice S-NSSAI 4:1. The administrative state associated with NRCellDU=2 and with slice 4:1 may be set to "Unlocked". The operational state associated with NRCellDU=2 and with slice S-NSSAI 4:1 may be set to "Enabled".

The NRCellDU=2 may not have a problem with slice S-NSSAI 1:FFFFFF. The administrative state associated with NRCellDU=2 and with slice 1:FFFFFF may be set to "Unlocked". The operational state associated with NRCellDU=2 and with slice S-NSSAI 1:FFFFFF may be set to "Enabled".

The NRCellDU=2 may not have a problem with slice S-NSSAI 2:FFFFFF. The administrative state associated with NRCellDU=2 and with slice 2:FFFFFF may be set to "Unlocked". The operational state associated with NRCellDU=2 and with slice S-NSSAI 2:FFFFFF may be set to "Enabled".

In this example, the NRCellDU IOC-level (non-slice-specific) "Administrative state" may be set to "Unlocked" in NRCellDU=1, since the whole cell is not locked for all traffic. The NRCellDU 100-level (non-slice-specific) "Operational state" may be set to "Enabled". However, the NRCellDU IOC-level (non-slice-specific) "Availability status" may be set to "Degraded" to indicate the object is degraded in some respect (i.e. it may not able to serve all slices/services assigned to it).

Figure 7:
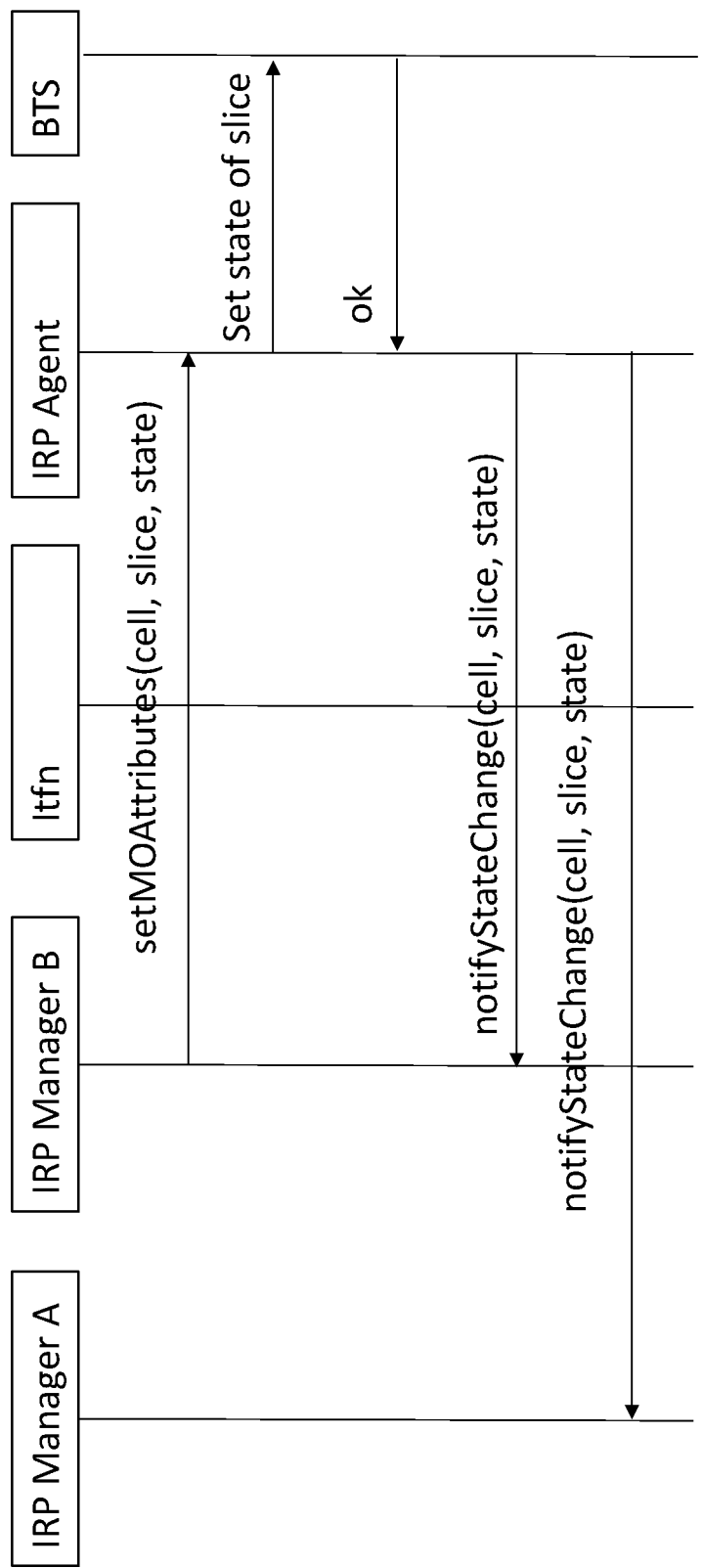
FIGS. 7 and 8 show a signalling diagram of a method for adjusting an administrative state, an operational state and/or an availability status of a network slice in a limited geographic area of at least one network resource according to one or more aspects.

FIG. 7 shows a signaling diagram for the above solution. For example, if an IRP Manager B wants to lock a slice S in a given subset of cells, it may use a BasicCMIRP (3GPP TS 32.602) method setMOAttributes to communicate to an IRP Agent. The parameter baseObjectInstance may be set to an IOC representing the slice under the NRCellDU and the parameter modificationList may contain the updated states for the IOC. The IRP Agent may update the state of the slice in the subset of cells by reconfiguring the BTS. Once the reconfiguration is complete, the IRP Agent may send out a notification using the KernelCMIRP (3GPP TS 32.662) notification notifyStateChange. An objectInstance parameter may contain the distinguished name (DN) of the same new slice IOC under the NRCellDU and a stateChange parameter may contain the updated states.

Note that if several IRP Managers have subscribed for notifications from this IRPAgent, they will all receive the notification and not only the IRP Manager that executed the reconfiguration. In case the slice-specific states are to be updated for a number of slices, the BasicCMIRP method setMOAttributes may called for all of them or alternatively the 3GPP BulkCMIRP may be used and separate notifyStateChange notifications may also be sent for each.

Figure 8:
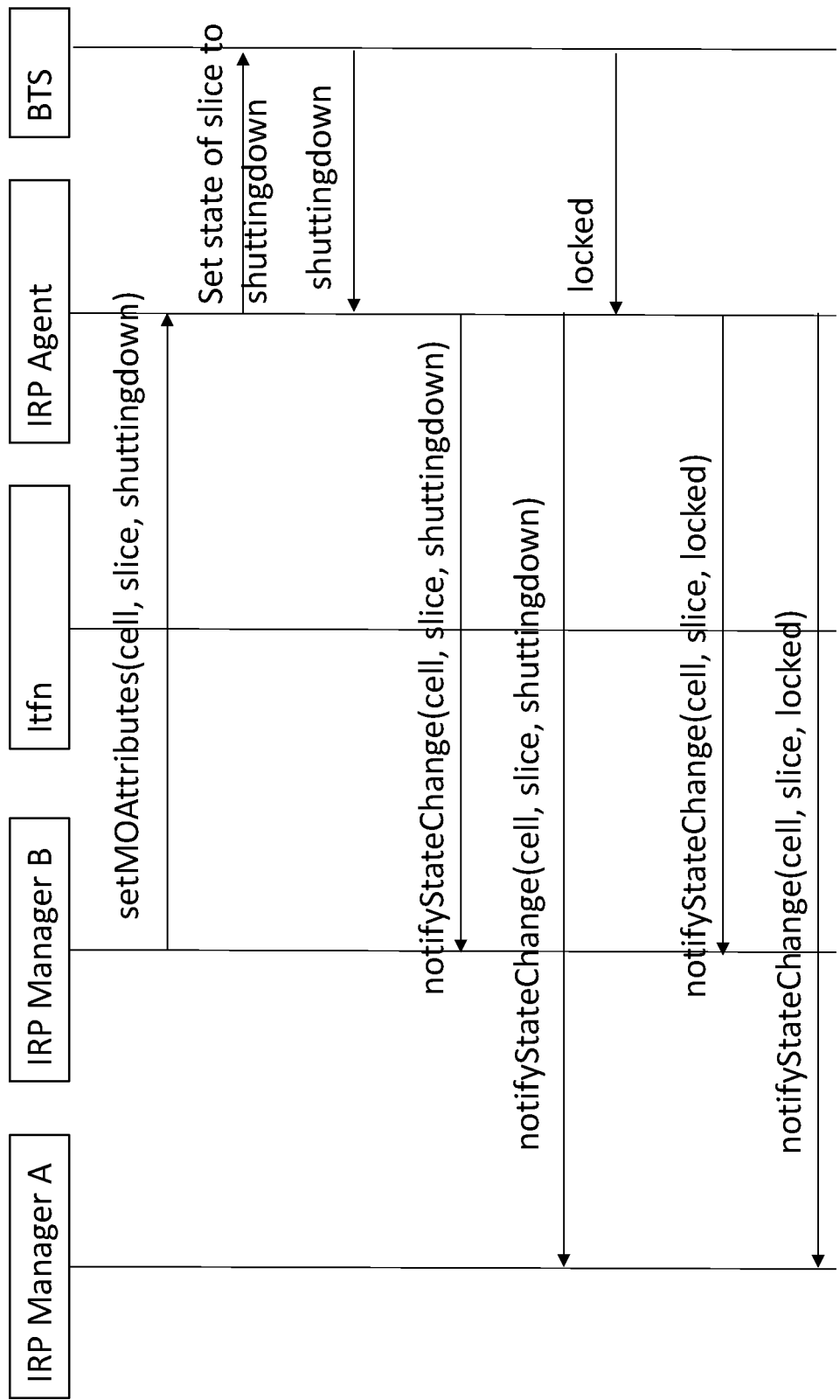

FIG. 8 shows a signaling diagram for the above solution for the special case of gracefully shutting down a slice in a given cell to reduce the slice's coverage area in a controlled manner. A difference with the signaling diagram of FIG. 7 is that when the slice state is set to shuttingdown in the cell, it may not accept any new connections to that slice and once the last terminal has left the slice in the cell, it may automatically put the slice to state locked. It may be noticed that the notifyStateChange notifications may be sent for each slice state change in the cell by the KernelCMIRP.

The solution may provide one or more of the following advantages.

The full state information may be provided so that the distinction may be made between the "lock" and "shuttingdown" states for a graceful shutdown in the administrative state.

A clear distinction may be made between commissioning and decommissioning a slice and changing its administrative state in the selected scope. Avoiding overloading the functionality may prevent unexpected side-effects and may ensure a "future-proof" solution.

Other states defined in the ITU-T X.731 may be supported using the same mechanism, including the operational state and the availability status.

Figure 9:
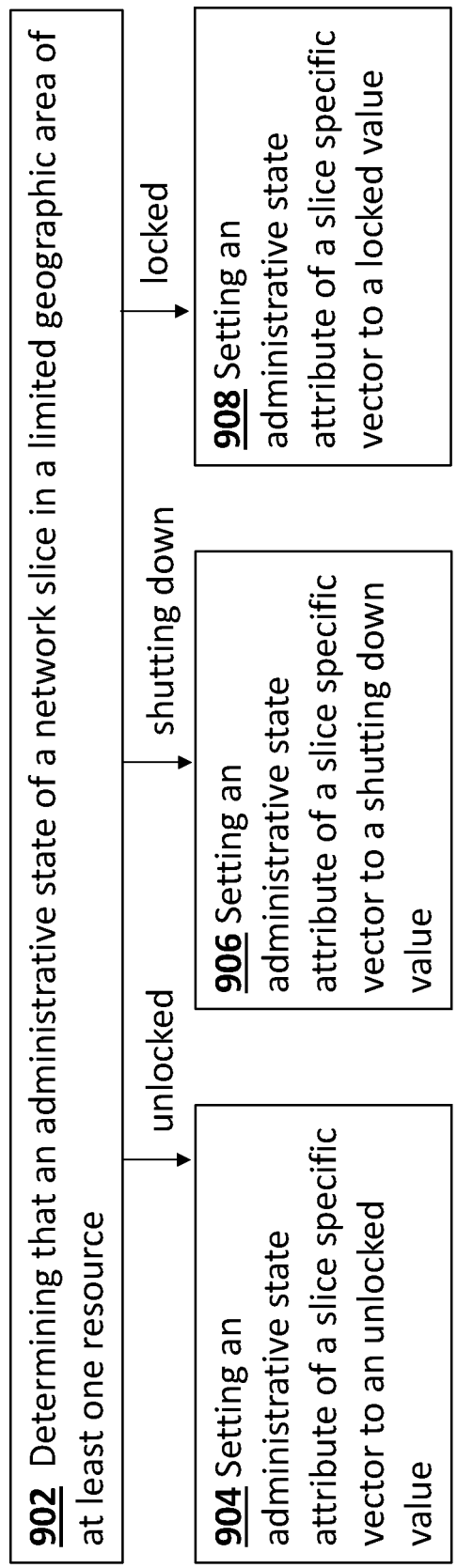
FIG. 9 shows a block diagram of a method for adjusting an administrative state of a network slice in a limited geographic area of at least one network resource according to one or more aspects.

FIG. 9 shows a block diagram of a method for adjusting an administrative state of a network slice in a limited geographic area of (e.g. defined by) at least one network resource supporting the network slice according to the above solution.

In step 902, the IRP agent may determine that an administrative state of a network slice is to be adjusted in a limited geographic area of at least one network resource supporting the network slice. By contrast, the IRP agent may determine that the administrative state of the network slice is not to be adjusted outside the limited geographic area of at least one other network resource supporting the network slice. For example, the IRP agent may receive a setMOAttributes message from an IRP manager (as illustrated on FIG. 7 or 8).

The at least one network resource defining the limited geographic area may be a radio access network resource (e.g. one or more cells) and/or a core network resource. The at least one other network resource defining outside the limited geographic area may be a radio access network resource (e.g. one or more cells) and/or a core network resource.

The at least one network resource defining the limited geographic area may be associated with a list of supported network slices (e.g. S-NSSAI list). The other network resource defining outside the limited geographic area may be associated with another list of supported network slices (e.g. S-NSSAI list).

Each network slice in the list of supported network slices (e.g. S-NSSAI list) associated with the at least one network resource defining the limited geographic area may be associated with a slice specific state vector comprising an administrative state attribute (and optionally an operational state attribute and/or an availability status attribute). Each network slice in the list of supported network slices (e.g. S-NSSAI list) associated with the other network resource defining outside the limited geographic area may be associated with a slice specific state vector comprising an administrative state attribute (and optionally an operational state attribute and/or an availability status attribute).

In other words, the at least one network resource defining the limited geographic area is associated with a plurality of slice specific vectors. The at least one other network resource defining outside the limited geographical area is associated with a plurality of slice specific vectors.

The administrative state may take a locked value, an unlocked value and/or shuttingdown value.

The limited geographic area may be smaller than the whole geographic coverage of the network slice.

If the administrative state of the network slice is to be adjusted to the unlocked value in the limited geographic area, the method may go to step 904. If the administrative state of the network slice is to be adjusted to the shutdown value in the limited geographic area, the method may go to step 906. If the administrative state of the network slice is to be adjusted to the locked value in the limited geographic area, the method may go to step 908.

In step 904 (i.e. administrative state to be adjusted to the unlocked value), the IRP agent may set the administrative state attribute of the slice specific vector associated with the at least one network resource defining the limited geographic area and the slice to the unlocked value. By contrast, the IRP may abstain from setting the administrative state attribute of the slice specific vector associated with the at least one other network resource defining outside the limited geographic area and the slice to the unlocked value.

In step 906 (i.e. administrative state to be adjusted to the shuttingdown value), the IRP agent may set the administrative state attribute of the slice specific vector associated with the at least one network resource defining the limited geographic area and the slice to the shuttingdown value. By contrast, the IRP may abstain from setting the administrative state attribute of the slice specific vector associated with the at least one other network resource defining outside the limited geographic area and the slice to the shuttingdown value.

In step 908 (i.e. administrative state to be adjusted to the locked value), the IRP agent may set the administrative state attribute of the slice specific vector associated with the at least one network resource defining the limited geographic area and the slice to the locked value. By contrast, the IRP may abstain from setting the administrative state attribute of the slice specific vector associated with the at least one other network resource defining outside the limited geographic area and the slice to the locked value.

Figure 10:
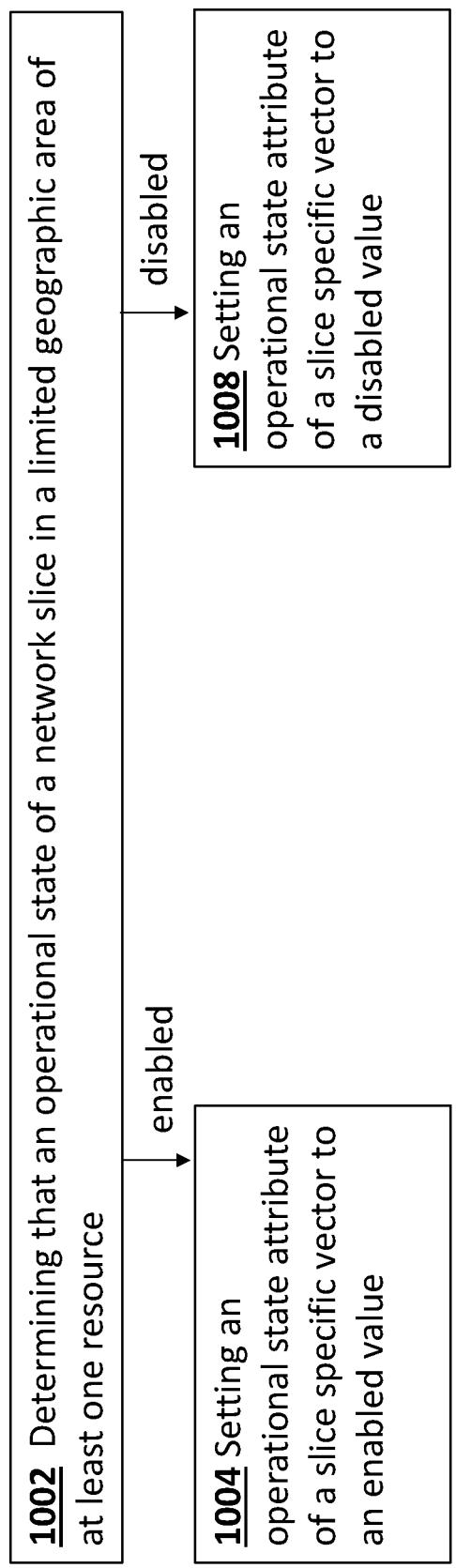
FIG. 10 shows a block diagram of a method for adjusting an operational state of a network slice in a limited geographic area of at least one network resource according to one or more aspects.

FIG. 10 shows a block diagram of a method for adjusting an operational state of a network slice in a limited geographic area of (e.g. defined by) at least one network resource supporting the network slice according to the above solution discussed above.

In step 1002, the IRP agent may determine that an operational state of a network slice is to be adjusted in a limited geographic area of at least one network resource supporting the network slice. By contrast, the IRP agent may determine that the network slice is not to be adjusted outside the limited geographic area of at least one other resource supporting the network slice. For example, the IRP agent may receive a setMOAttributes message from an IRP manager (as illustrated on FIG. 7).

The at least one network resource defining the limited geographic area may be a radio access network resource (e.g. one or more cells) and/or a core network resource. The at least one other network resource defining outside the limited geographic area may be a radio access network resource (e.g. one or more cells) and/or a core network resource.

The at least one network resource defining the limited geographic area may be associated with a list of supported network slices (e.g. S-NSSAI list). The at least one other network resource defining outside the limited geographic area may be associated with another list of supported network slices (e.g. S-NSSAI list).

Each network slice in the list of supported network slices (e.g. S-NSSAI list) associated with the at least one network resource defining the limited geographic area may be associated with a slice specific state vector comprising an operational state attribute (and optionally an administrative state attribute and/or an availability status attribute). Each network slice in the list of supported network slices (e.g. S-NSSAI list) associated with the at least one other network resource defining outside the limited geographic area may be associated with a slice specific state vector comprising an operational state attribute (and optionally an administrative state attribute and/or an availability status attribute).

In other words, the at least one network resource defining the limited geographic area is associated with a plurality of slice specific vectors. The at least one other network resource defining outside the limited geographical area is associated with a plurality of slice specific vectors.

The operational state may take an enabled value and/or disabled value.

The limited geographic area may be smaller the geographic coverage of the network slice.

If the operational state of the network slice is to be adjusted to the enabled value in the limited geographic area, the method may go to step 1004. If the operational state of the resource supporting the network slice is to be adjusted to the disabled value in the limited geographic area, the method may go to step 1008.

In step 1004 (i.e. operational state to be adjusted to the enabled value), the IRP agent may set the operational state attribute of the slice specific vector associated with the at least one network resource defining the limited geographic area and the slice to the enabled value. By contrast, the IRP may abstain from setting the operational state attribute of the slice specific vector associated with the at least one other network resource defining the limited geographic area and the slice to the enabled value.

In step 1008 (i.e. operational state to be adjusted to the disabled value), the IRP agent may set the operational state attribute of the slice specific vector associated with the at least one network resource defining the limited geographic area and the slice to the disabled value. By contrast, the IRP may abstain from setting the operational state attribute of the slice specific vector associated with the at least one other network resource defining outside the limited geographic area and the slice to the disabled value.

Figure 11:
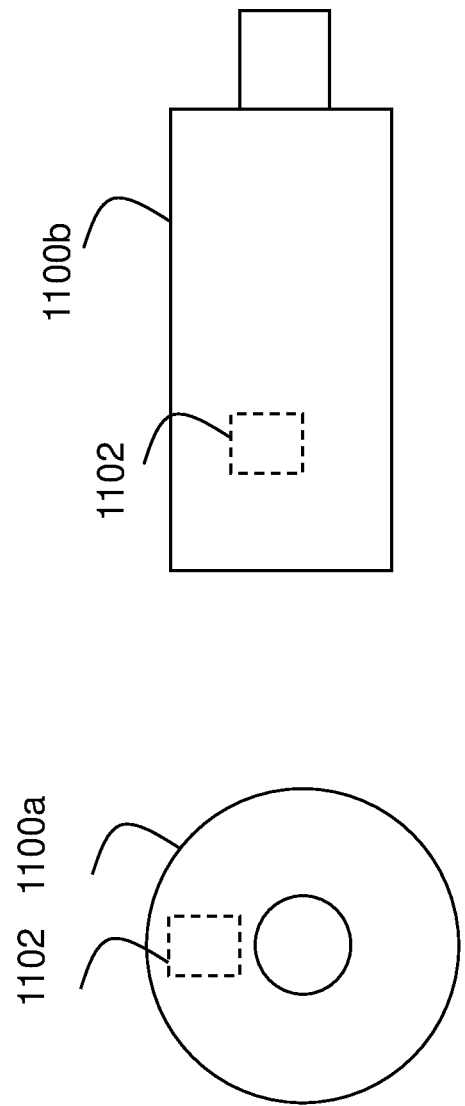
FIG. 11 shows a schematic representation of a non-volatile memory medium storing instructions which when executed by a processor allow a processor to perform one or more of the steps of the method of any of FIGS. 9 and 10.

FIG. 11 shows a schematic representation of non-volatile memory media 1400*a* (e.g. computer disc (CD) or digital versatile disc (DVD)) and 1400*b* (e.g. universal serial bus (USB) memory stick) storing instructions and/or parameters 1402 which when executed by a processor allow the processor to perform one or more of the steps of the methods of FIGS. 9 and 10.

It is noted that while the above describes example embodiments, there are several variations and modifications which may be made to the disclosed solution without departing from the scope of the present invention.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any procedures, e.g., as in FIGS. 9 and 10, may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Alternatively or additionally some embodiments may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:
(a) hardware-only circuit implementations (such as implementations in only analogue and/or digital circuitry);

(b) combinations of hardware circuits and software, such as:
  (i) a combination of analogue and/or digital hardware circuit(s) with software/firmware and
  (ii) any portions of hardware processor(s) with software (including digital signal processor(s)), software, and memory(ies) that work together to cause an apparatus, such as the communications device or base station to perform the various functions previously described; and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

What is claimed is:

1. An apparatus comprising:
   at least one processor; and
   at least one memory including computer program code;
   the at least one memory and the computer program code configured to, with the at least one processor, cause the apparatus at least to:
     determine that at least one state of a network slice is to be adjusted in a limited geographical area of at least one network resource, wherein the limited geographical area is smaller than a geographic coverage of the network slice; and
     adjust the at least one state of the network slice in the limited geographical area of the at least one network resource, wherein the at least one state of the network slice comprises an administrative state, wherein the administrative state takes a locked value, unlocked value and a shutting down value,
   wherein the at least one network resource is associated with a list of network slices supported by the network resource,
   wherein each network slice in the list of network slices supported by the at least one network resource is associated with a slice specific state vector of at least one state attribute,
   wherein adjusting the at least one state of the network slice comprises adjusting the at least one state attribute of the slice specific vector,
   wherein the at least one state of the network slice further comprises an availability status, wherein the availability status takes an in test value, a degraded value, a dependency value, a failed value, a power off value, an off line value, an off duty value a not installed value and a log full value.

2. The apparatus of claim 1, wherein the at least one network resource comprises a core network resource.

3. The apparatus of claim 1, wherein the at least one network resource comprises a radio access network resource.

4. The apparatus of claim 3, wherein the at least one network resource comprises a tracking area.

5. The apparatus of claim 3, wherein the at least one network resource comprises a cell.

6. The apparatus of claim 1, wherein the at least one state of the network slice comprises an operational state.

7. The apparatus of claim 5, wherein the operational state takes at least one of an enabled value or a disable value.

8. The apparatus of claim 1, wherein the at least one memory and the computer program code are configured to, with the at least one processor, cause the apparatus at least to:
   send a notification that the at least one state of the network slice has been adjusted in the limited geographical area of the at least one network resource to a management service provider.

9. The apparatus of claim 1, wherein the at least one memory and the computer program code are configured to, with the at least one processor, cause the apparatus at least to:
   send a notification that the at least one state of the network slice has been adjusted in the limited geographical area of the at least one network resource to a management service provider if the management service provider has subscribed to notifications.

10. The apparatus of claim 1, wherein the at least one memory and the computer program code are configured to, with the at least one processor, cause the apparatus at least to:
    determine that at least one state of the network slice is not to be adjusted outside the limited geographic area of at least one other network resource; and abstain from adjusting the at least one state of the network slice outside the limited geographic area of the at least one other network resource.

11. A method comprising:
    determining that at least one state of a network slice is to be adjusted in a limited geographical area of at least one network resource, wherein the limited geographical area is smaller than a geographic coverage of the network slice; and
    adjusting the at least one state of the network slice in the limited geographical area of the at least one network resource, wherein the at least one state of the network slice comprises an administrative state, wherein the administrative state takes a locked value, unlocked value and a shutting down value,
    wherein the at least one network resource is associated with a list of network slices supported by the network resource,
    wherein each network slice in the list of network slices supported by the at least one network resource is associated with a slice specific state vector of at least one state attribute,
    wherein adjusting the at least one state of the network slice comprises adjusting the at least one state attribute of the slice specific vector,
    wherein the at least one state of the network slice further comprises an availability status, wherein the availability status takes an in test value, a degraded value, a dependency value, a failed value, a power off value, an off line value, an off duty value, a not installed value and a log full value.

12. A non-transitory computer readable medium comprising computer executable instructions which when run on one or more processors perform:
   determining that at least one state of a network slice is to be adjusted in a limited geographical area of at least one network resource, wherein the limited geographical area is smaller than a geographic coverage of the network slice; and
   adjusting the at least one state of the network slice in the limited geographical area of the at least one network resource, wherein the at least one state of the network slice comprises an administrative state, wherein the administrative state takes a locked value, unlocked value and a shutting down value,
   wherein the at least one network resource is associated with a list of network slices supported by the network resource,
   wherein each network slice in the list of network slices supported by the at least one network resource is associated with a slice specific state vector of at least one state attribute,
   wherein adjusting the at least one state of the network slice comprises adjusting the at least one state attribute of the slice specific vector,
   wherein the at least one state of the network slice further comprises an availability status, wherein the availability status takes an in test value, a degraded value, a dependency value, a failed value, a power off value, an off line value, an off duty value, a not installed value and a log full value.

* * * * *